US008613891B2

(12) United States Patent
Hofte et al.

(10) Patent No.: US 8,613,891 B2

(45) Date of Patent: Dec. 24, 2013

(54) AUTOMATIC DISHWASHING PRODUCT

(75) Inventors: Paulus Antonius Augustinus Hofte, Astene (BE); Pedro Vincent Vandecappelle, Wetteren (BE); Giovanni Scarabaggio, Pescara (IT); Italo Corzani, Chieti (IT); Yessica De Nardin, Pescara (IT); Juana Rios, Newcastle (GB)

(73) Assignee: The Procter & Gamble Company, Cincinnati, OH (US)

( * ) Notice: Subject to any disclaimer, the term of this patent is extended or adjusted under 35 U.S.C. 154(b) by 13 days.

(21) Appl. No.: 13/091,437

(22) Filed: Apr. 21, 2011

(65) Prior Publication Data

US 2011/0262317 A1 Oct. 27, 2011

(30) Foreign Application Priority Data

Apr. 23, 2010 (EP) .................................... 10160968

(51) Int. Cl.

| | |
|---|---|
| ***B01D 11/02*** | (2006.01) |
| ***B01D 12/00*** | (2006.01) |
| ***B01D 15/00*** | (2006.01) |

(52) U.S. Cl.

USPC ........... 422/271; 422/261; 422/266; 422/269; 422/270; 422/272

(58) Field of Classification Search

USPC .................. 422/266, 261, 269, 270, 271, 272

See application file for complete search history.

(56) References Cited

U.S. PATENT DOCUMENTS

| | | | | |
|---|---|---|---|---|
| 3,880,765 | A | 4/1975 | Watson | |
| 4,000,093 | A | 12/1976 | Nicol et al. | |
| 4,246,612 | A | 1/1981 | Berry et al. | |
| 4,340,766 | A | 7/1982 | Klahr et al. | |
| 4,760,025 | A | 7/1988 | Estell et al. | |
| 4,810,410 | A | 3/1989 | Diakun et al. | |
| 4,965,012 | A | 10/1990 | Olson et al. | |
| 5,114,611 | A | 5/1992 | Van Kralingen et al. | |
| 5,227,084 | A | 7/1993 | Martens et al. | |
| 5,244,594 | A | 9/1993 | Favre et al. | |
| 5,528,867 | A | 6/1996 | Thompson | |
| 5,576,281 | A | 11/1996 | Bunch et al. | |
| 5,593,648 | A * | 1/1997 | Christie et al. | 422/266 |
| 5,679,630 | A | 10/1997 | Baeck et al. | |
| 5,695,679 | A | 12/1997 | Christie | |
| 5,698,046 | A | 12/1997 | St. Laurent et al. | |
| 5,763,385 | A | 6/1998 | Bott et al. | |

(Continued)

FOREIGN PATENT DOCUMENTS

| | | |
|---|---|---|
| DE | 101 58 604 A1 | 6/2003 |
| DE | 10 2005 03315 A1 | 1/2007 |

(Continued)

OTHER PUBLICATIONS

U.S. Appl. No. 13/091,395, filed Apr. 21, 2011, Hofte, et al.

(Continued)

*Primary Examiner* — Regina M Yoo

(74) *Attorney, Agent, or Firm* — David Upite

(57) ABSTRACT

An automatic dishwashing product comprising a multi-dosing detergent delivery device comprising a housing (101, 110) for receiving therein a detergent holder (102) and a detergent holder (102) accommodating a plurality of detergent doses (104, 106) and a scenting composition wherein the scenting composition comprises a perfume and a polyolefin.

6 Claims, 12 Drawing Sheets

(56) References Cited

U.S. PATENT DOCUMENTS

| | | | |
|---|---|---|---|
| 5,824,532 | A | 10/1998 | Barnett et al. |
| 5,856,164 | A | 1/1999 | Outtrup et al. |
| 5,989,169 | A | 11/1999 | Svendsen et al. |
| 6,093,562 | A | 7/2000 | Bisgard-Frantzen et al. |
| 6,187,576 | B1 | 2/2001 | Svendsen et al. |
| 6,204,232 | B1 | 3/2001 | Borchert et al. |
| 6,312,936 | B1 | 11/2001 | Poulose et al. |
| 6,403,355 | B1 | 6/2002 | Hagihara et al. |
| 6,599,871 | B2 | 7/2003 | Smith |
| 6,605,458 | B1 | 8/2003 | Hansen et al. |
| 6,638,748 | B2 | 10/2003 | Hatada et al. |
| 6,652,606 | B1 * | 11/2003 | Zimmerman .................. 44/268 |
| 7,141,403 | B2 | 11/2006 | Outtrup et al. |
| 7,262,042 | B2 | 8/2007 | Weber et al. |
| 7,472,710 | B2 * | 1/2009 | Jowett et al. .................... 134/93 |
| 7,985,569 | B2 | 7/2011 | Aehle et al. |
| 2004/0065670 | A1 | 4/2004 | Morgan et al. |
| 2005/0236420 | A1 * | 10/2005 | Jowett et al. ................. 221/248 |
| 2005/0272878 | A1 * | 12/2005 | Corzani et al. ............... 525/321 |
| 2008/0092282 | A1 * | 4/2008 | Altmann et al. ................. 4/231 |
| 2008/0132625 | A1 | 6/2008 | Niehaus et al. |
| 2008/0293604 | A1 | 11/2008 | Gibis et al. |
| 2008/0293610 | A1 | 11/2008 | Shaw et al. |
| 2009/0075855 | A1 | 3/2009 | Gibis et al. |
| 2009/0239778 | A1 | 9/2009 | Gentschev et al. |
| 2010/0016203 | A1 | 1/2010 | Warkotsch et al. |
| 2010/0031978 | A1 | 2/2010 | Housmekerides et al. |
| 2010/0104488 | A1 | 4/2010 | Housmekerides et al. |
| 2010/0132748 | A1 | 6/2010 | Kessler et al. |
| 2010/0154832 | A1 | 6/2010 | Zipfel et al. |
| 2010/0160204 | A1 | 6/2010 | Zipfel et al. |
| 2011/0053819 | A1 | 3/2011 | Preuschen et al. |
| 2011/0059517 | A1 | 3/2011 | Augustinus et al. |

FOREIGN PATENT DOCUMENTS

| | | | |
|---|---|---|---|
| DE | 10 2007 056920 | A1 | 5/2009 |
| DE | 10 2008 026932 | A1 | 12/2009 |
| DE | 10 2008 047943 | A1 | 3/2010 |
| EP | 0 481 547 | A1 | 4/1992 |
| EP | 1 543 763 | A1 | 6/2005 |
| WO | WO 94/02597 | A1 | 2/1994 |
| WO | WO 00/60060 | A2 | 10/2000 |
| WO | WO 2006/002643 | A2 | 1/2006 |
| WO | WO 2006/133776 | A1 | 12/2006 |
| WO | WO 2008/053178 | A1 | 5/2008 |
| WO | WO 2009/021867 | A2 | 2/2009 |

OTHER PUBLICATIONS

U.S. Appl. No. 13/091,418, filed Apr. 21, 2011, Hofte, et al.
Search Report; Dated Oct. 5, 2010; 8 Pages.

* cited by examiner

AUTOMATIC DISHWASHING PRODUCT

TECHNICAL FIELD

The present invention is in the field of automatic dishwashing. In particular it relates to an automatic dishwashing product comprising a multi-dosing detergent delivery device capable of scenting during an automatic dishwashing operation and between automatic dishwashing operations. The product of the invention adds convenience and improves the automatic dishwashing experience.

BACKGROUND OF THE INVENTION

Items to be cleaned in an automatic dishwashing machine are soiled with food residues. The nature of the residues is quite diverse depending on the food that has been deposited on or cooked in the dishware/tableware. Usually the food residues have a plurality of malodours associated to them. Malodours can also come from food residues accumulated in dishwasher's parts such as the filter. The filter is usually a wet environment with food residues prone to bacteria degradation that usually have malodours associated to it.

The malodours can become evident during the automatic dishwashing operation either because there is superposition or combination of malodours that in terms give rise to other malodours and/or because the high temperature and humidity conditions found during an automatic dishwashing operation contribute to an easier perception of the malodours. Malodours can also be evident upon loading the dishwasher, especially if food residues degrade or rot.

Automatic dishwashing machines are usually placed in kitchens where users cook and frequently eat and they do not like to have unpleasant odours coming from the automatic dishwashing machine.

Auto-dosing devices are permanently placed into the automatic dishwashing machine and they are prone to collect food and residues during the automatic dishwashing operation. The food and residues can generate additional malodours.

There is a need to reduce or eliminate the malodours that are generated during an automatic dishwashing operation and substitute the malodours by pleasant fragrance in the area surrounding the dishwasher during use.

Machine fresheners are known in the art. They are devices that hang in the dishwasher and release a perfume over time. The perfume release profile tend to be non-homogeneous over time, usually a high level of perfume is delivered at the beginning of the life of the freshener—that sometime can be overpowering—and the release profile can drop dramatically with time. In addition, the fluctuating temperature and humidity conditions found in an automatic dishwashing environment lead to some difficulties with some of the known machine fresheners.

The aim of the present invention is to overcome the above mentioned drawbacks.

SUMMARY OF THE INVENTION

According to a first aspect of the invention, there is provided an automatic dishwashing product. The product comprises a multi-dosing detergent delivery device for use in an automatic dishwashing machine. The device comprises: i) a housing for receiving therein a detergent holder; and ii) a detergent holder. The detergent holder accommodates a plurality of detergent doses. Preferably the detergent holder is replaceable or refillable. Once all the detergent doses have been used the holder can be replaced by a new holder or it can be filled with new doses. Especially preferred from an easiness of use viewpoint are replaceable detergent holders.

By "multi-dosing detergent delivery device" is meant a device capable of delivering one or more detergent doses over a plurality of automatic dishwashing operations without human intervention, i.e. the user places the device in the automatic dishwashing machine and the device delivers the doses over a number of operations. Once the detergent doses are finished the detergent holder is refilled or replaced.

The detergent holder accommodates a scenting composition, by "scenting composition" is herein meant a product capable of delivering a pleasant smell such as a fragrance or perfume.

The scenting product of the invention comprises a perfume and a polyolefin. The polyolefin preferably has a crystallinity of from about 5% to about 60%, more preferably from about 6% to about 50%, even more preferably from about 10% to about 40% and especially from about 10% to about 30%.

The scenting composition preferably has a crystallinity of from about 0.5% to about 60%, more preferably from about 1% to about 50%, even more preferably from about 5% to about 40% and especially from about 10% to about 30%.

The scenting composition provides a very uniform perfume delivery profile even under stressed conditions such as the high temperature and humidity condition found in an automatic dishwashing machine in operation. The composition would deliver perfume in a nearly constant manner during dishwashing operations and in between them. The composition also presents very good physical properties, it is quite malleable and pleasant to touch.

Preferably the composition has a melting point above 70° C., more preferably above 75° C. and especially above 80° C. (measured as described herein below). This implies that the composition is solid and allows the formation of shaped solid bodies that provide sustained release of perfume. The solid bodies are extremely suitable to be placed into the detergent holder. The scenting composition can be placed in a central cavity of the detergent holder to continuously release a perfume or bad odour suppressor into the dishwashing machine over a number of dishwashing operation and in between dishwashing operations. The scenting composition can be activated at first use by removing a sealing label or the like covering the cavity.

The preferred polyolefin for use herein is polybutene-1. The term "polybutene-1" includes a homopolymer of butene-1 or a copolymer of butene-1 with another α-olefin having 2 to 20 carbon atoms. In case of the copolymer, the ratio of another α-olefin to be copolymerized is 20 mole % or less, preferably 10 mole % or less and particularly preferably 5 mole % or less. Examples of another α-olefin to be copolymerized include ethylene, propylene, hexene, 4-methylpentene-1, octene-1, decene-1, octadecene-1, etc. Especially preferred for use herein are copolymers of butane-1 and ethylene.

In preferred embodiments the composition comprises a wax, preferably a microcrystalline wax. Without being bound by theory, it is believed that wax, in particular microcrystalline wax, contribute to improve the physical properties of the composition, in particular the wax can contribute to reduce brittleness.

The composition of the invention can optionally comprise a nucleating agent. A nucleating agent is a processing aid that accelerates crystal formation reducing the processing times.

In preferred embodiments, the perfume comprises at least about 10%, more preferably at least about 20% and especially at least 30% by weight of the perfume of blooming perfume ingredients having a boiling point of less than 260° C. and a ClogP of at least 3. The perfume would also typically comprise non-blooming perfume ingredients having a boiling point of more than 260° C. and a ClogP of at least 3, preferably less than about 30%, more preferably less than about 25% and preferably between 5 and 20% by weight of the perfume of non-blooming perfume ingredients.

The perfume of the composition of the present invention are typically very effusive and consumer noticeable, leaving minimal residual perfume on the washed items, including dishes, glasses and cutlery, especially those made of plastic, rubber and silicone. The compositions can leave a residual perfume in the automatic dishwashing machine that can be enjoyed by the user in between dishwashing operations.

A blooming perfume ingredient is characterized by its boiling point (B.P.) and its octanol/water partition coefficient (P). The octanol/water partition coefficient of a perfume ingredient is the ratio between its equilibrium concentrations in octanol and in water. Since the partition coefficients of the preferred perfume ingredients herein have high values, they are more conveniently given in the form of their logarithm to the base 10, log P. The B.P. herein is determined at the normal, standard pressure of 760 mm Hg.

In preferred embodiments the composition comprises from about 20% to about 90%, more preferably from about 30% to about 70% and especially from about 35% to about 65% by weight thereof of polyolefin, preferably the polyolefin is polybutene-1. The composition preferably comprises from about 10% to about 60%, more preferably from about 20% to about 55% and especially from about 30% to about 50% by weight thereof of perfume. The composition preferably comprises from about 20% to about 60%, more preferably from about 25% to about 55% and especially from about 30% to about 50% by weight thereof of wax, preferably a microcrystalline wax.

The scenting composition can be placed into the detergent holder described in WO 2007/052004 and WO 2007/0833141. The dosing elements can have an elongated shape and set into an array forming a delivery cartridge which is the refill for an auto-dosing dispensing device as described in case WO 2007/051989. The detergent holder can be placed in an auto-dosing delivery device, such as that described in WO 2008/053191.

Preferably the device comprises a mono-dimensional actuating means for providing movement of the holder relative to the housing. By "mono-dimensional" is herein meant that the movement happens in only one plane as opposite to more than one as the case is with the device disclosed in WO 2008/053178. In '178 device the indexing means needs to move firstly in one plane and secondly in a second plane perpendicular to the first one to deliver a dose in each dishwashing operation. The mono-dimensional actuating means of the device of the present invention allows for devices of simpler construction than the devices of the prior art and allows for more space efficient geometries, such as planar geometry. The device of the invention is suitable for the delivery of different doses at different points of the dishwashing operation. '178 device seems only be suitable for the delivery one dose per dishwashing operation. The next dose is only ready for delivery in the next dishwashing operation.

Preferably, the actuating means comprises a guided means and a driving means. Preferably the driving means comprises a thermally reactive element. Whilst the thermally reactive element may be any of a memory metal/memory alloy, thermal bimetal, bimetal snap element or shape memory polymer, it is most preferably a wax motor. A wax motor is a small cylinder filled with a heat sensitive wax which expands upon melting and contracts upon solidifying. This expansion of the wax can be used by the driving means to drive the guided means forward.

The thermally reactive element is preferably designed to react at temperatures between 25° C. and 55° C., more preferably 35° C. to 45° C. The thermally reactive element preferably has a hysteresis effect. This delays the operation of the thermal element to ensure that the device is not reset by the fluctuating temperatures that can be found in the different cycles of an automatic dishwashing operation but is only reset once the machine has carried out a full dishwashing operation.

Preferably the thermally reactive element has an activation temperature of from about 35° C. to about 45° C. and a de-activation temperature of from about 25° C. to about 33° C. For the wax motor the melting and solidification profile of the wax can be used to achieve the desired hysteresis, because certain waxes show a slow solidification compared to melting.

The guided means are driven by the driving means. The guided means preferably comprise a following means and a track to accommodate the following means, i.e. the path taken by the following means is dictated by the track. The track preferably has a zig-zag configuration in which each up and down path corresponds with a full dishwashing operation. To deliver x detergent doses over x dishwashing operations the zig-zag track needs to have x paths forwards and x paths downwards.

The zig-zag track preferably can be used in a circular pattern which leads to a circular movement of the detergent holder or it can be used in a linear pattern which leads to a linear movement of the detergent holder. A wave pattern or combinations of arc segments and linear patterns can be used to accommodate specific designs and movements of the detergent holder.

It should be noted that the track can be integrated in one of the permanent component of the housing and the motion of this component can then be transferred to the detergent holder via mechanical means or the track can be integrated directly into the detergent holder so that after insertion of the holder the following means engage with the track. The track can be manufactured via injection molding, thermoforming, vacuum casting, etching, galvanizing sintering, laser cutting or other techniques known in the art.

The following means travels alternatively forwards and backwards within the track, powered by the driving means. Preferably, the actuating means further comprises returning means that helps the driving means to return to its initial position once the appropriated conditions are achieved in the automatic dishwashing machine (for example, when the temperature is below about 30° C. in the case of the driving means comprising a wax motor, the wax would contract and the returning means would take the driving means to its initial position). The returning means could for example be a biasing spring or flexible element with sufficient spring force to push the piston in the wax motor back to its initial position when the wax solidifies and therefore contracts.

The advancement of the detergent holder is accomplished by the combination of the driving means, the guided means and if present the returning means. This combination allows for the delivery of two different doses at two different times of the dishwashing operation.

For instance the first dose in the detergent holder can be readily exposed at the start of the wash cycle or get exposed to the wash water or it can be ejected from the detergent holder early in the wash cycle when the temperature slowly rises in the dishwasher and the wax motor starts to expand. The second dose can be exposed or ejected when the wax motor is further expanded when the dishwasher heats up further or during the cold rinse cycles when the first contraction starts. At the end of the wash cycle the complete contraction moves the detergent holder to the next dose ready for the next wash cycle.

It should be noted that the configuration of the track and the angles of its zig-zag pattern determine the movement of the detergent holder and therefore the movement and desired release points of detergent doses can be pre-dictated by this track. This enables large design flexibility in the delivery of the detergent doses at various times during a dishwashing operation. Even a sequential release of three or more doses can be achieved by the use of this kind of tracks.

Preferably, the track comprises slots and ramps. The role of the ramps is to guide the movement of the detergent holder in one direction only. When the temperature increases the following means are driven through the track powered by the driving means and move over the ramp into the first slot. These slots prevent that the following means return through the same path in the track upon contraction of the driving means. As such the followings means are forced to follow the desired return path in the track and translate this movement into a further movement of the detergent holder. At the end of the contraction the following means are driven over a second ramp into the next slot and move the detergent holder further.

To enable the following means to move up over the ramps and down into the slots the following means can be designed to pivot either by a spring loaded pin or by a pivot point to keep the following means at all times in the track.

Preferably, the track comprises harbours. The role of the harbours is to allow further expansion or contraction of the driving means without causing further movement of the detergent holder and to prevent the build-up of high forces in the system when the driving means reaches its maximum expansion or contraction. For instance with a wax motor with a total expansion stroke of 15 mm, the harbours enable to use only the expansion from 5 mm to 10 mm to generate movement of the detergent holder while in the first 5 mm or last 5 mm of the stroke the following means are kept in the harbours and therefore the detergent holder is kept in the same position. This feature helps to overcome the large variation in dishwashing machine cycles and temperature profiles and enable a very specific and pre-defined movement of the detergent holder.

The device is preferably a stand-alone device. By "stand-alone" is herein meant that the device is not connected to an external energy source.

The device of the present invention is preferably of a planar geometry (ie., a disc, a square, a rectangle, etc). Planar geometry is more space efficient than any tri-dimensional geometry, thereby leaving more free space in the dishwasher for the items to be washed.

According to a second aspect of the invention, there is provided a method of scenting an automatic dishwashing machine during a dishwashing operation and between operations, the method comprising the step of using the automatic dishwashing product of the invention to continuously deliver a perfume. The product provides a very consistent perfume delivery profile over time. The perfume delivery during a dishwashing operation is very similar to that in between operations. The consumer gets a very pleasant scent when interacting with the automatic dishwasher, i.e. during loading and unloading.

The method is suitable for scenting environments in which the temperature rises significantly above room temperature. The method is especially suitable for scenting an automatic dishwashing machine, during a dishwashing operation and in between dishwashing operations.

DETAILED DESCRIPTION OF THE INVENTION

Figure 1:
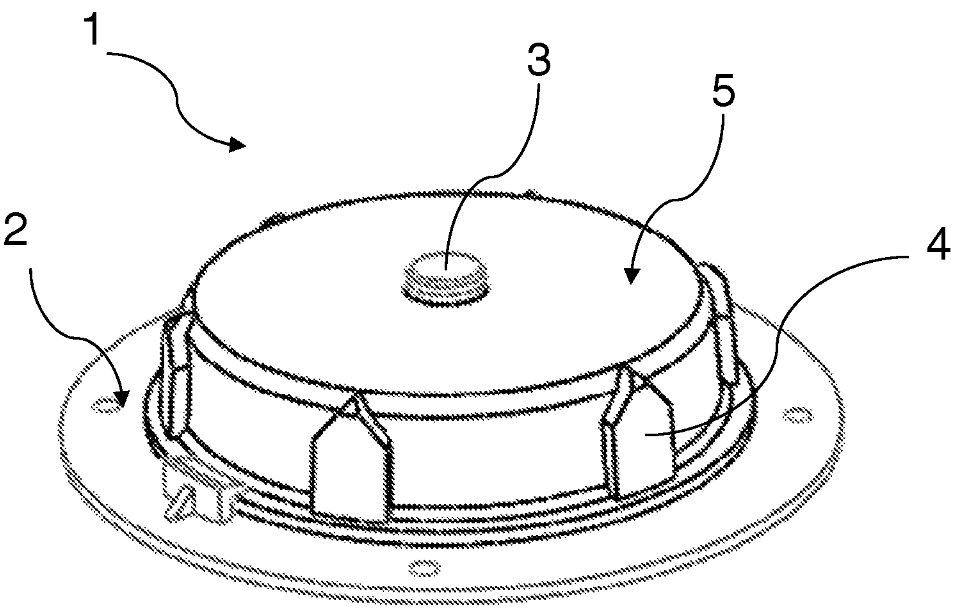
FIG. 1 shows in perspective an assembly view of the actuating means 1 comprising a baseplate with the driving means 2 and a rotating cover with the guided means 5.

The present invention envisages a product comprising an auto-dosing device which comprises a scenting composition and a method for scenting an automatic dishwashing machine using such product. The product is extremely suitable for use in an automatic dishwashing machine which involves high temperature and humidity conditions. The product of the invention provides a multitude of benefits. The scenting occurs during the operation of the appliance and in between operations. The scenting composition is part of the auto-dosing device thus the user does not need to use two separate products. As indicated herein before, the product provides a uniform perfume delivery profile over time, even under the high temperature and humidity conditions found in an automatic dishwashing machine.

An automatic dishwashing operation typically comprises three or more cycles: a pre-wash cycle, a main-wash cycle and one or more rinse cycles. The pre-wash is usually a cold water cycle, the main-wash is usually a hot water cycle, the water comes in cold and is heated up to about 55 or 65° C. Rinsing usually comprises two or more separate cycles following the main wash, the first being cold and, the final one starting cold with heat-up to about 65° C. or 70° C.

Polyolefin

Any semi-crystalline polyolefin having a crystallinity of from about 5% to about 60% is suitable for use herein. Preferred polyolefin for use herein is polybutene-1. The term "polybutene-1" includes any semi-crystalline homopolymers obtained by the polymerization of high-purity butene-1, preferably in the presence of a Ziegler-type catalyst. The term "polybutene-1" also includes copolymers of butene-1 with other polyolefin like ethylene, propylene, hexene, 4-methylpentene-1, octene-1, decene-1, octadecene-1, etc. Especially preferred polybutene-1 is a copolymer of polybutene-1 and ethylene.

The polybutene-1 for use herein is semi crystalline, and typically has high-molecular-weight, with a high degree of isotacticity that offers useful combinations of high heat resistance and freeze tolerance as well as flexibility, toughness, stress crack resistance and creep resistance. Polybutene-1 present slower setup times than those of other polyolefins, this seems to be because of its unique delayed crystallization, and by its polymorphism. High crystallinity olefins usually are not highly mixable with perfumes. Because of its unique crystallinity behavior polybutene-1 is mixable with perfumes at higher concentration than other polyolefins. When mixing the polybutene-1 with perfume in the certain amount as here disclosed the crystals formation is further delayed as well as the rate of formation is decreased but not totally. The final mixture can retain some of the mechanical properties of the polybutene-1.

Preferred polybutene-1 for use herein includes DP8510M and DP8911 supplied by Basell-Lyondel. Especially preferred for use herein is DP8911.

Crystallinity

The degree of crystallinity has a great influence on hardness, density, transparency, softening point and diffusion of solid materials. Many polymers have both a crystalline and amorphous regions. In these cases, crystallinity is specified as a percentage of the mass of the material that is crystalline with respect to the total mass.

Crystallinity can be measured using x-ray diffraction techniques and differential scanning calorimetry (DSC).

For example, methods ASTM E 793-06 (Enthalpies of Fusion and Crystallization by Differential Scanning calorimetry) or ASTM F 2625-07 (Measurement of Enthalpy of Fusion, Percent Crystallinity, and Melting Point of Ultra-High-Molecular Weight Polyethylene by Means of Differential Scanning calorimetry) can be used to determine the Enthalpy of Fusion and then the crystallinity of the polyolefin and the composition of the invention. For the purpose of this invention, crystallinity is measured following ASTM E 793-06. The crystallinity of a polyolefin is calculated against published values of the 100% crystalline corresponding material. For example, in the case of polybutene-1 the enthalpy of fusion of 100% crystalline material (stable form I) is 135 J/g (ref. "The heat of fusion of polybutene-1" table 3, Howard W. Starkweather Jr., Glover A. Jones E.I. du Pont de Nemours and Company, Central Research and Development Department, Experimental Station, Wilmington, Del. 19898).

To measure the crystallinity of the composition, a sample of it must be first conditioned for 15 days at 23° C. in a sealed aluminum bag to avoid perfumes loosing over time. Then a DSC analysis is run according the method ASTM E 793-06 (temperature rate 10° C./min) to measure the enthalpy of fusion of the composition. In order to have an indication of where the reference peak of the DSC of the composition should be found a DSC of the current polyolefin of the mixture is run to determine the melting point of the polyolefin.

The enthalpy of fusion of the composition sample is then normalized by dividing the obtained value by the weight of the sample to get the specific enthalpy of fusion by gram of sample (i.e. J/g) and then by dividing again this latter value by the standard 100% polybutene-1 crystalline material enthalpy of fusion value (i.e. 135 J/g) to finally get the crystallinity of the composition.

It has to be noted that many DSC instruments are able to calculate directly both the normalized enthalpy of fusion of the sample and the crystallinity.

The crystallinity of the polybutene-1 is measured in an analogous manner.

Melting Point

The melting point of the composition of the invention is determined using the standard method ASTM D-4440 (Dynamic Mechanical Properties Melt Rheology). The method consists in measuring the rheological properties of a composition disc specimen in a temperature range (from 25° C. to 100° C.). The disc specimen has the same diameter of the parallel plate geometry used in the measurement. A 25 mm disc is used. The discs are prepared previously using plastic frames with 25 mm discs hole and 2 mm thickness. The composition is melt and poured in the disc frames. Exceeding material is removed with a spatula. The sample is then cooled down and stored for 24 hr at 23° C. in a climatic room and in sealed aluminum bags. The rheometer used is a SR5 Stress controlled (Rheometrics®). The "melting point" (also referred as melting at crossover point) of a viscous-elastic material like the composition of the invention is defined as the temperature value at which the "liquid/viscous characteristic part" (known as loss modulus G") and the "rigid/solid characteristic part" (known as elastic modulus G') are equal.

Perfume

Any perfume is suitable for use in the product of the invention, any of the current compositions used in perfumery. These can be discreet chemicals; more often, however, they are more or less complex mixtures of volatile liquid ingredients of natural or synthetic origin. The nature of these ingredients can be found in specialised books of perfumery, e.g. in S. Arctander (Perfume and Flavor Chemicals, Montclair N.J., USA 1969).

The perfumes herein can be relatively simple in their composition or can comprise highly sophisticated, complex mixtures or natural and synthetic chemical components.

In preferred embodiments, the perfume comprises at least about 10%, more preferably at least about 20% and especially at least 30% by weight of the perfume of blooming perfume ingredients having a boiling point of less than 260° C. and a ClogP of at least 3. The perfume would also typically comprise non-blooming perfume ingredients having a boiling point of more than 260° C. and a ClogP of at least 3, preferably less than about 30%, more preferably less than about 25% and preferably between 5 and 20% by weight of the perfume of non-blooming perfume ingredients.

The perfume of the composition of the present invention are typically very effusive and consumer noticeable, leaving minimal residual perfume on the washed items, including dishes, glasses and cutlery, especially those made of plastic, rubber and silicone. The compositions can leave a residual perfume in the automatic dishwashing machine that can be enjoyed by the user in between dishwashing operations.

A blooming perfume ingredient is characterized by its boiling point (B.P.) and its octanol/water partition coefficient (P). The octanol/water partition coefficient of a perfume ingredient is the ratio between its equilibrium concentrations in octanol and in water. Since the partition coefficients of the preferred perfume ingredients herein have high values, they are more conveniently given in the form of their logarithm to the base 10, log P. The B.P. herein is determined at the normal, standard pressure of 760 mm Hg.

Wax

Suitable wax for use herein includes paraffin wax, long-chain alkanes, esters, polyesters and hydroxy esters of long-chain primary alcohols and fatty acids, naphthenic and iso-paraffinic long chain hydrocarbons, petrolatum. They can be natural or synthetic. The waxes are excellent oil binding allowing perfume incorporation in the composition at high levels.

Commercial waxes include beeswax, carnauba wax, petroleum waxes, microcrystalline wax, petroleum jelly and polyethylene waxes. Especially preferred for use herein is a microcrystalline wax. Preferred commercial material includes Permulgin 4201 supplied by Koster Keunen (Holland)

Nucleating Agent

Nucleating agents accelerate the formation of crystals in polymers containing polybutene and copolymers thereof. Nucleating agents promote the growth of the crystal by lowering the activation energy required for crystal organization. By using nucleating agents, the nucleation starts occurring at a higher temperature than in the polyolefin containing composition without nucleating agents. Further during the cooling phase, the number of polymer crystals increases as well as the final distribution result more uniform than in the case in which no nucleating agent is used. Suitable nucleating agents include talc, benzoates, phosphate ester salts, sorbitol derivatives, or commercial products like Hyperform® HPN-20E, Hyperform® HPN-68L by Milliken Co.

Optional components to be added to the scenting composition of the product of the invention include tackifying resins, as those described in US 2008/0132625 A1, paragraph [0020], plasticizers, as those described in US 2008/0132625 A1, paragraph [0023]. If present the tackifying resin would be in a level of from about 1% to about 50% wt. If present the plasticizer would be in a level of from about 1% to about 50% wt. Further additives can be incorporated into the product of the invention in quantities of up to 15 wt % in order to vary certain properties. These can be, for example, dyes, pigments, or fillers such as titanium dioxide, talcum, clay, chalk, and the like. They can also, for example, be stabilizers or adhesion promoters.

Examples of devices in accordance with the present invention will now be described with reference to the accompanying drawings, in which:

FIGS. 1, 2, 3, 4 and 5 show respective assembled, perspective exploded and internal perspective views of the rotating actuating means 1 comprising the driving means 2 and the guided means 5. The driving means 2 comprises an axes 3 around which the cover with the guided means 5 can rotate at specific intervals defined by the profile of the guided track 10 inside the cover 5.

Figure 13A:
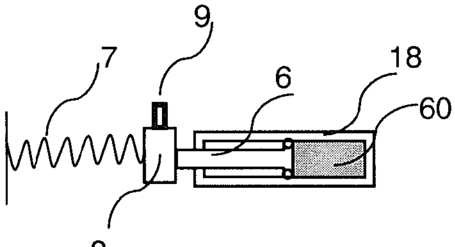
FIG. 13 (*a*) and FIG. 13 (*b*) respectively show a schematic view of the driving means in contracted (cold) position (i.e.; temperature less than 30-34° C. wax contracts return stroke via bias spring) and in the expanded (hot) position (i.e.; temperature greater than 36-38° C. wax expands stroke up to 15 mm).
Figure 13B:
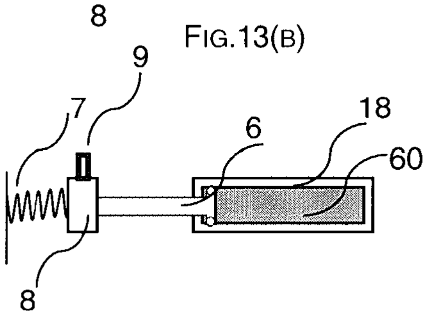
Figure 14:
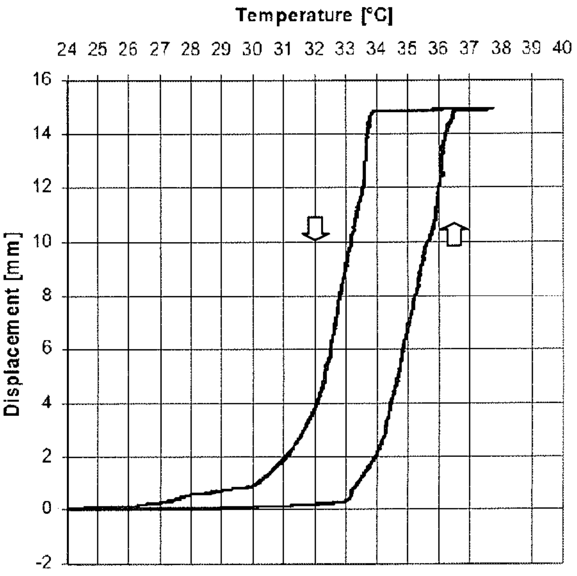
FIG. 14 shows a graph illustrating the hysteresis profile of the actuation temperature of the wax motor during an expansion (heating) and contraction (cooling) cycle.

The driving means further comprise a thermal reactive element 18 which is in this configuration a wax motor. As shown in FIG. 13(*a*) a wax motor 18 is basically a cylinder filled with a thermal sensitive wax 60 under a piston 6. When temperature in the automatic dishwashing machine brings the wax to or above its melting temperature it will start to expand as shown in FIG. 13(*b*) This expansion pushes the piston outwards developing a considerable force, up to 50N and more and a considerable movement, or stroke of the piston. For instance for a cylinder with a total length of 30 mm and +/−6 mm diameter half filled with a solid wax under the piston a stroke of the piston of 15 mm can be achieved, meaning an expansion of the wax by a factor 2 upon melting.

Figure 2:
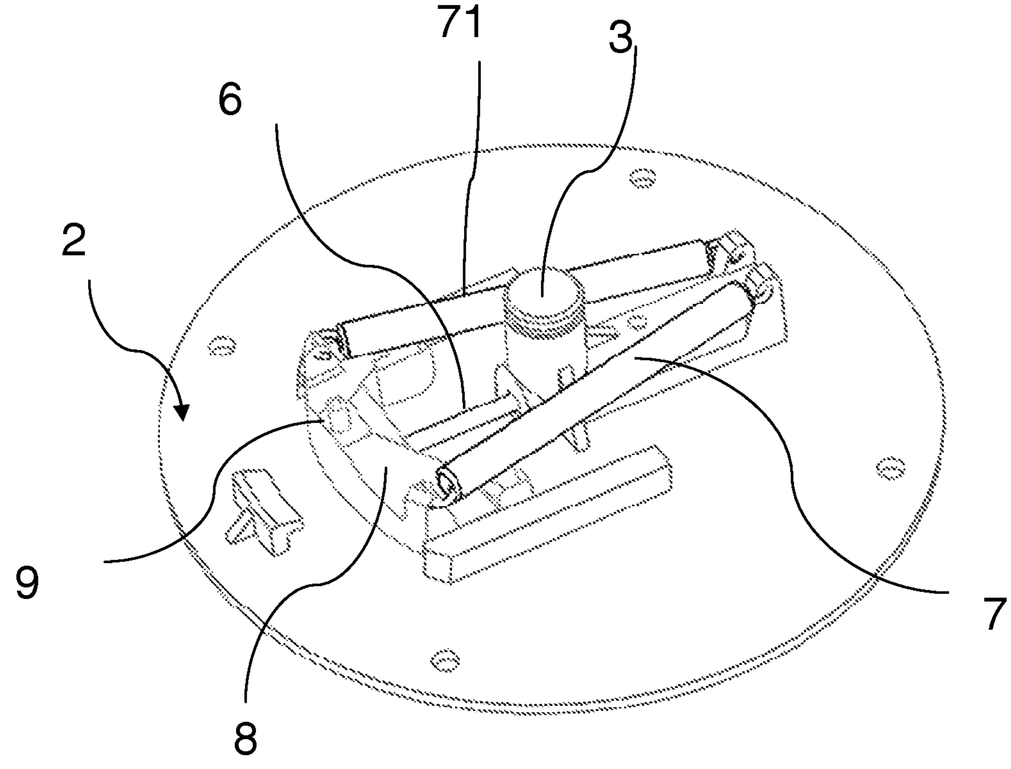
FIG. 2 shows a perspective assembly detail of the driving means 2 with the rotating cover 5 removed.

This outward movement of the piston puts the returning means, which in FIG. 2 are two coil springs 7 and 71, and in FIGS. 13(*a*) and 13(*b*) a single coils spring, under tension.

When the temperature in the dishwasher cools down below the solidification temperature again, at the end of the wash, the wax contracts, allowing the piston 6 to move back. The returning means pushes the piston back into the starting position.

This forwards and backwards movement of the piston or "the stroke" of the wax motor 18 is used to drive the following means 8 with the following pin 9 forward and backwards assisted by the returning means 7 and 71. The returning means, in this case two tension springs 7 and 71 are connected on one side to the following means 8 and on the other side to the static baseplate 2. To achieve a linear and smooth motion forward and backwards the following means run in supporting rails 20 and 22.

It should be noted that the returning means in the form of a compression spring can also be inserted inside of the wax motor 18, above the piston 6 so that upon expansion of the wax the spring compresses and upon cooling it can expand to its starting position.

In one preferred embodiment of the invention this forward and backwards movement of the driving means 18 and following means 8 and following pin 9 can now be used to rotate the cover 5 via the guided means 10 on the inside of this cover.

Figure 3:
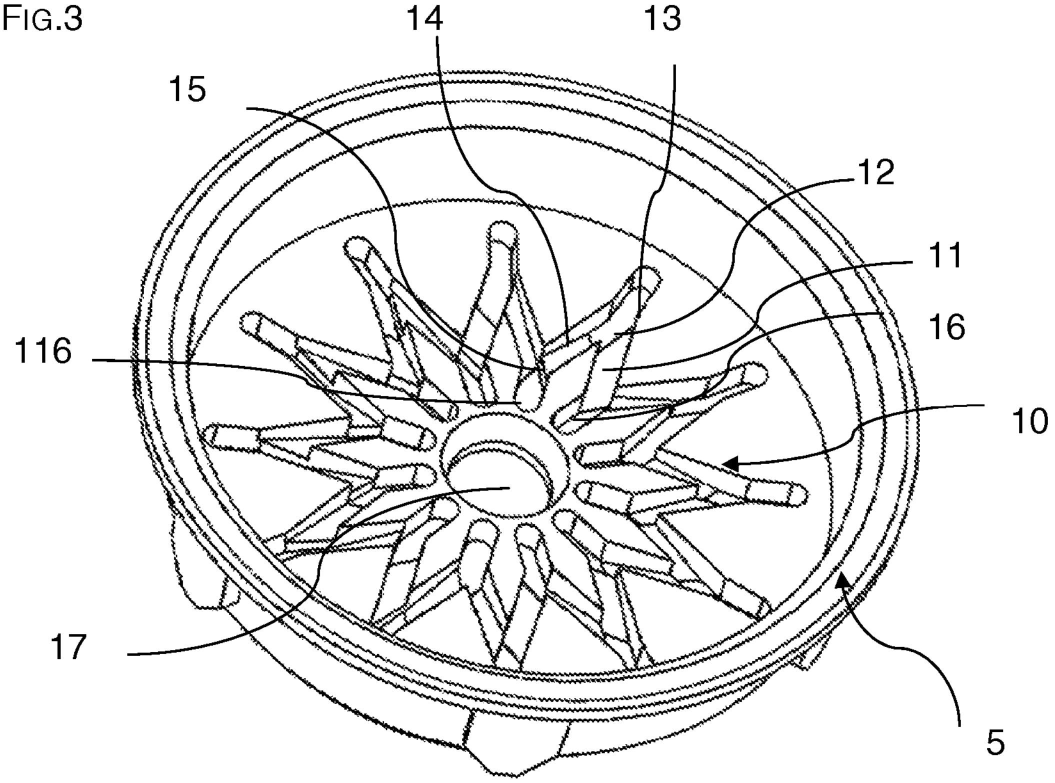
FIG. 3: shows a perspective view of the circular guided means inside the rotating cover 5 with a circular zig-zag track 10.
Figure 4A:
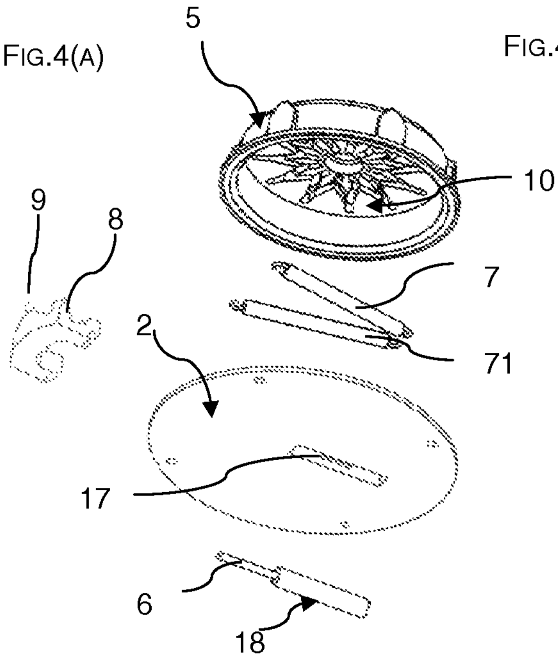
FIGS. 4(*a*) and 4(*b*) are perspective exploded views of the actuating means mechanism with following means 8 with follower pin 9 and returning means 7 and 71.
Figure 4B:
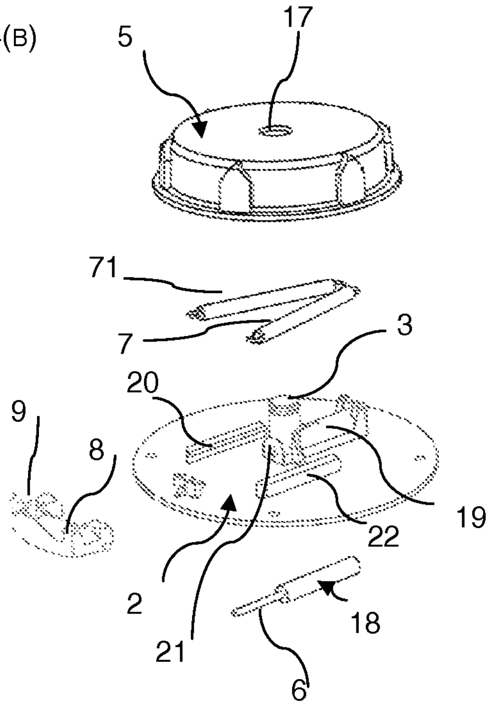
Figure 5:
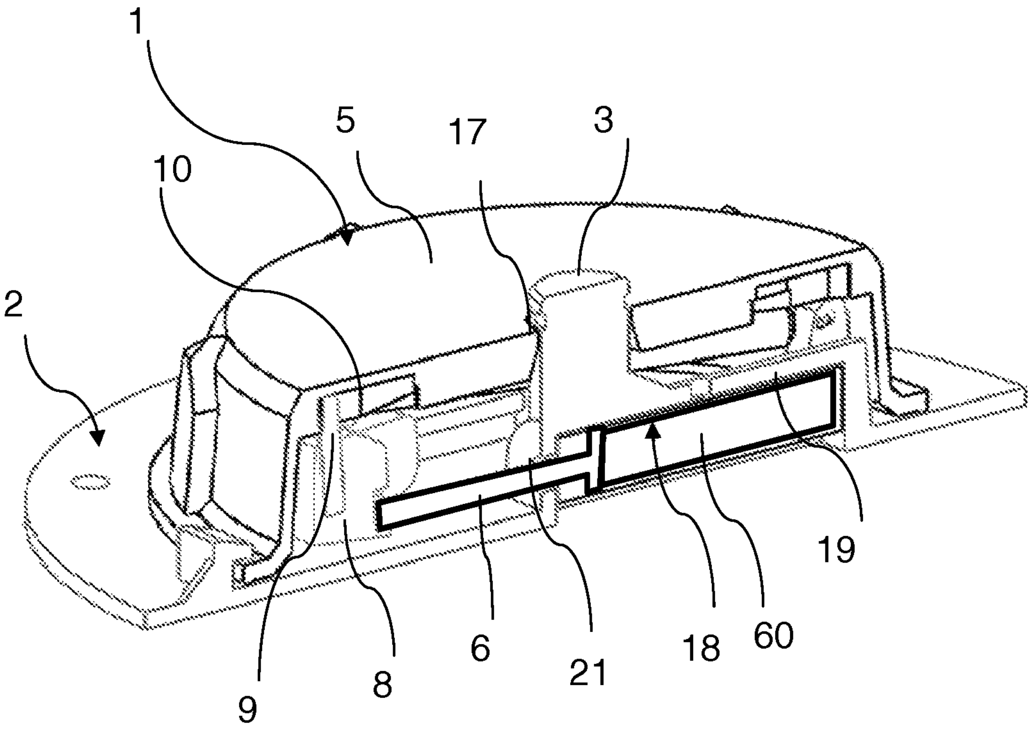
FIG. 5 shows in perspective cross-sectional view the assembled actuating mechanism with waxmotor 18 and follower pin 9 in the expanded position.

FIG. 3 shows a detail of the guided means, in this configuration the guided means 10 are a circular zig-zag repetitive track with harbours 13 and 16, ramps 11 and 14 and slots 12 and 15. The following describes one complete cycle:

At the start of an automatic dishwashing operation the automatic dishwashing machine is cold and the wax motor is contracted with the follower pin 9 positioned in the "cold" harbour 16. When the machine heats up the wax starts to expand when it reaches its melting temperature. This drives the follower pin 9 forward through the first path of the track over the ramp 11 and as such rotates the cover over a certain angle. At further expansion the following pin drops over the ramp into the slot 12 and from there the further expansion drives it into the "warm" harbour 13. The harbour allows the following pin to continue moving till full expansion without causing any further movement to the cover 5.

When the automatic dishwashing machine starts to cool down below the solidification temperature of the wax, the wax motor slowly starts to contract and moves the following pin out of the "warm" harbour 13. The slot 12 prevent that pin can return through the path with ramp 11 and therefore forces the pin to follow the new path over ramp 14 into slot 15 causing a further rotation to the cover 5. The further contraction moves the pin 9 back into the next "cold" harbour 116 where it can fully contract without causing further motion to the cover 5.

At this point the actuating device is ready for the next dishwashing operation.

It should be noted that one forward and backward movement through the zig-zag track corresponds with one complete wash program of the dishwashing machine.

In this circular configuration as per FIG. 3 the multiple peaks and valleys on the zig-zag track define the number of detergent dosages that can be provided. The shown configuration can automatically provide detergent over 12 complete dishwashing operations.

Figure 7:
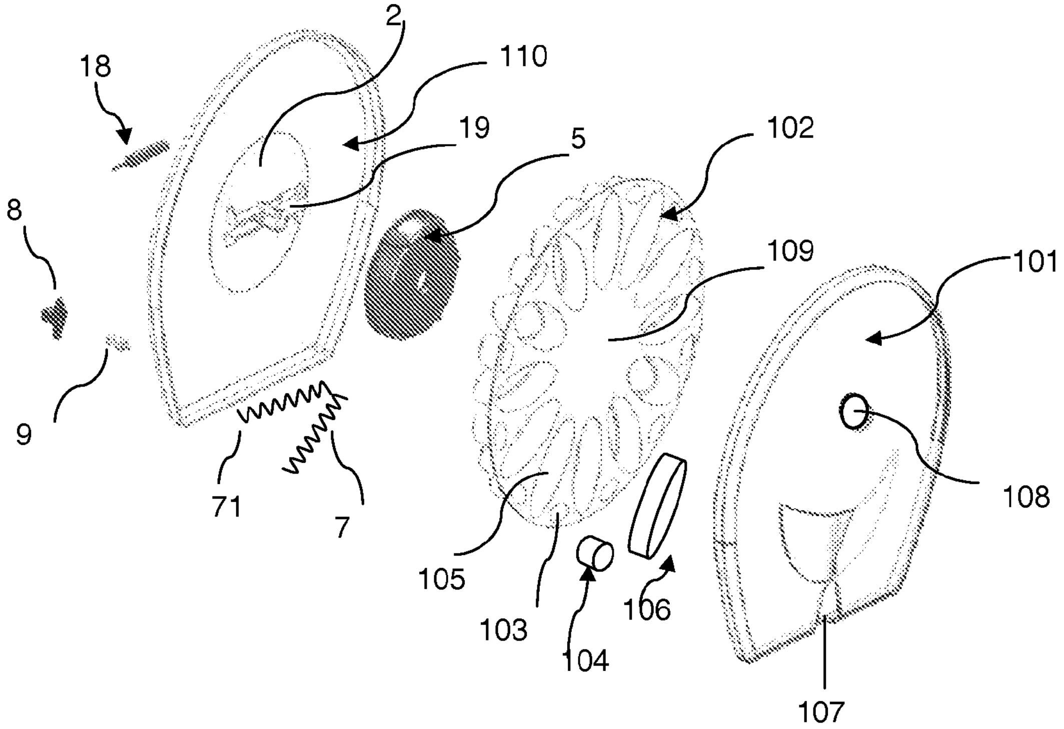
FIG. 7 shows an exploded view of the multi-dosing detergent holder 102 in a disc shaped housing 101 and 110 with the actuating mechanism and the perfume composition 202 in a cavity 201 with a perfume release window 203.
Figure 8:
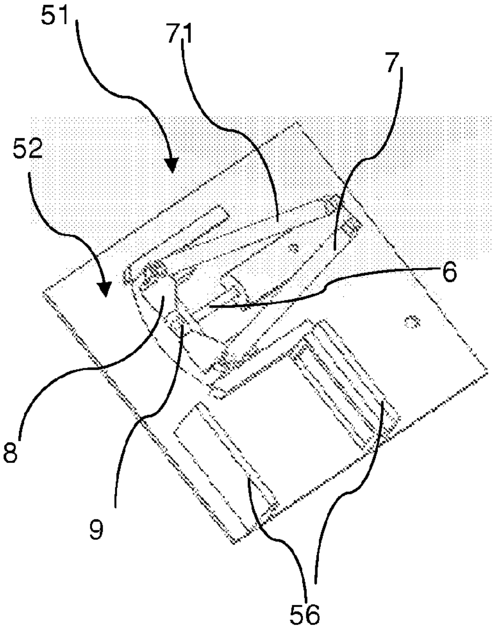
FIG. 8 shows a perspective assembly view of the actuating mechanism 51 for a rectangular shaped guided means.
Figure 9:
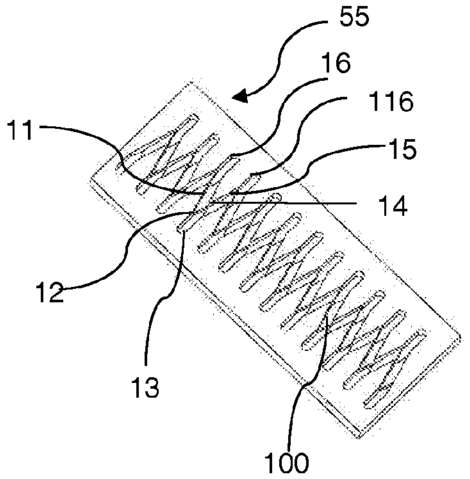
FIG. 9 shows a perspective view of the rectangular guided means 55 with a linear zig-zag track 100.
Figure 10A:
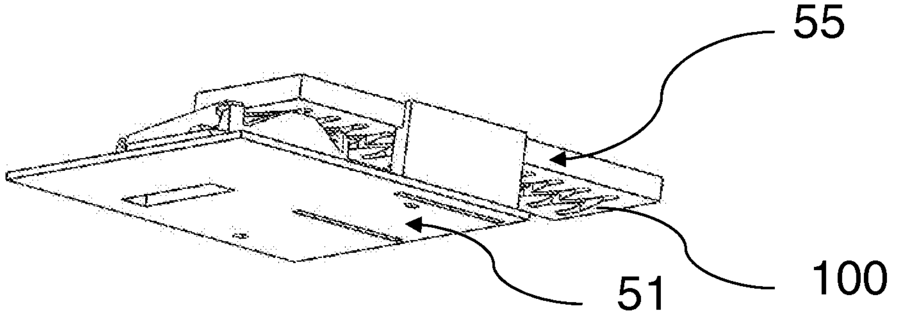
FIGS. 10(*a*) and 10(*b*) show perspective assembly views of the actuating mechanism 51 and the rectangular guided means 55.
Figure 10B:
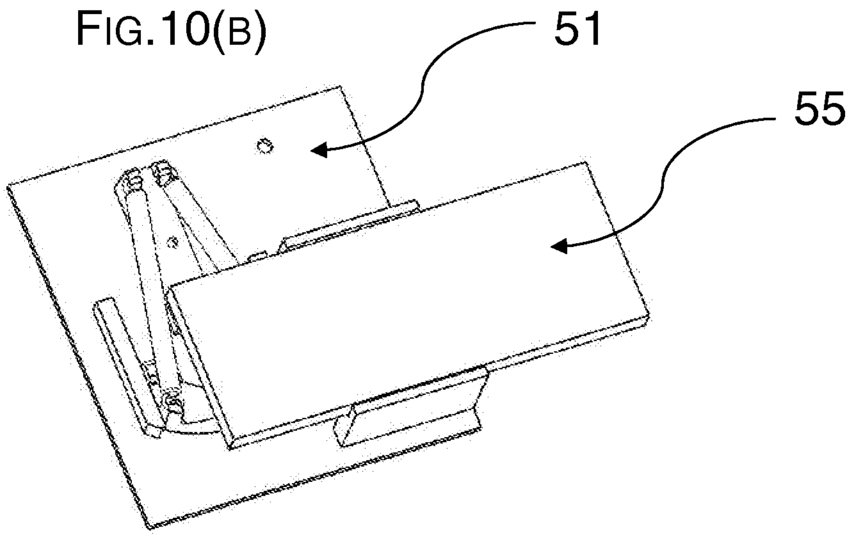

It will now be described how the rotational movement of the cover 5 drives the detergent holder 102 in the housing 110 and 101 shown in exploded perspective view FIG. 7. In this configuration the driving means 2 with the wax motor 18, the returning means 7 and 71 and following means 9 and follower pin 9 are in this case integrated in one half of the housing 110. The rotating cover 5 with guiding means is clipped over it with the follower pin positioned in the first "cold" harbour.

The detergent holder 102 with the multiple detergent doses is inserted in this housing with the bottom engaging with the rotating cover 5. The housing is closed with the second half of the housing 101. The cover 5 can have guiding ribs 4 and other features to easily mate with detergent holder 102 so that the circular movement of the rotating cover can be transferred to the detergent holder throughout the various dishwashing operations.

It should be noted that the configuration of the track 10 and the angles of its zig-zag pattern determine the movement of cover 5 and thus the detergent holder 102. Therefore the movement and desired release points can be dictated by this track. This enables large design flexibility in the delivery of the products at various points during the wash and rinse cycle(s). Even a sequential release of two or more doses can be achieved by the use of this kind of tracks.

In another preferred embodiment the guided means 10 can be directly integrated into the detergent holder 102. In this case there is no need for a rotating cap 5 and the back and forward motion of the driving means can be directly transferred into the rotation of the detergent holder.

It should be noted that in this case the pattern of the track can be flexible and be different for different detergent holders, enabling specific release points in the dishwashing operation tailored to deliver different detergent doses at optimum times in a dishwashing operation.

The zig-zag track 10 in the rotating cap or into the detergent holder can be formed via various techniques known in the art like injection molding, thermoforming, compression molding, laser cutting, etching, galvanising or the like or can be separately produced and fixed to cap or the detergent holder via well known glueing, welding or sealing or mechanical clipping techniques.

The release of the detergent doses can be established in various ways using this multi-dosing detergent delivery device. In one preferred embodiment shown on FIG. 7 a first detergent dose 104 and a second detergent dose 106 are placed in separate cavities 103 and 105 of the detergent holder 102. The detergent holder in this case can contain a non limiting number of 12 doses of the first and 12 doses of the second detergent.

At the start of the dishwashing operation the first detergent 104 can be exposed to the wash liquor in the automatic dishwasher via the open gate 107 in the housing while the other detergent doses are protected from the liquor by the housing. As explained before as the temperature rises the wax in the wax motor 18 expands and the piston 6 drives the follower pin 9 through the track 10 which rotates the detergent holder 102 to the next position where the second detergent 106 gets exposed to wash liquor via the open gate 107. When the machine cools down again the wax motor contracts and rotates the detergent holder to the next position ready for the next wash.

It should be noted that during the rotation more than one detergent dose can be exposed or released sequentially, either direct at the start, in the first prewash, during the main-wash or during the first or second rinse cycle and even during the final heating, drying cycle and cooling cycle by accurately making use of the specific expanding or contracting stroke length of the wax motor in function of temperature. The shape and angles of the zig-zag track then define the rotational speed and rotational angle of the detergent holder.

The first 104 and or second detergent doses 106 can either be exposed to the wash liquor or can be dropped into the dishwashing machine through the open gate 107 using gravity or by actively pushing it out of the cavities 103 and/or 105 by running the detergent holder over a small ramp featured on the inside of the housing 110. This ramp feature applies a gradual increasing force on the underside of the cavity to pop the detergent dose out of the cavities 103 and/or 105 during the rotational movement. In this case a deformable base in the detergent holder like a flexible deep drawn film, a blister pack or thin wall thermoformed cavities will help the release of the first and/or second detergent doses.

In another embodiment the ramp feature can run through one or more open slots in the base of the detergent cavities 103 and/or 105 to actively push the content out through the open gate 107 into the dishwashing machine. In a further variation the housing can have more than one open gate 107.

The first and second detergent doses can be protected against the high humidity and high temperature conditions in the dishwashing machine via additional sealing and barrier features and materials in the housing or by covering the cavities of the detergent holder with a water-soluble PVA film or a non soluble moisture barrier film which can be pierced or torn open during the release operation.

Figure 6A:
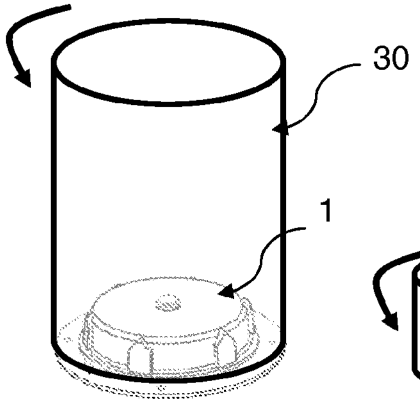
FIGS. 6(*a*) and 6(*b*) shows respectively a schematic perspective of the actuating mechanism in a cylindrical housing and in a planar disc shaped housing.
Figure 6B:
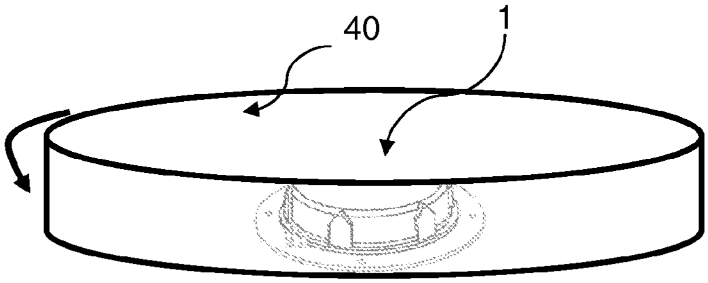

The perspective view in FIGS. 6(*a*) and 6(*b*) illustrate that the actuating means 1 can be used in a cylindrical housing 30 or in a disc shaped housing 40 or any further shape that can accommodate the rotational movement. The detergent holders can also have different shapes to match with these specific housings.

Further means for easy insertion and removal of the detergent holder can be integrated in the housing and the detergent holder, like locking features, clipping features, (spring loaded) opening features, (spring loaded) ejecting features, etc.

Another embodiment of this invention is shown in the perspective assembly, detailed and exploded views shown in FIGS. 8, 9, 10, 11 and 12. The driving means with the wax motor 18 and the forward and backward moving following means 8 and follower pin 9 on the piston 6 are in this configuration transferred into a linear unidirectional motion of the guided plate 55 via the linear zig-zag track 100 with ramps, slots and harbours as described before.

Figure 11:
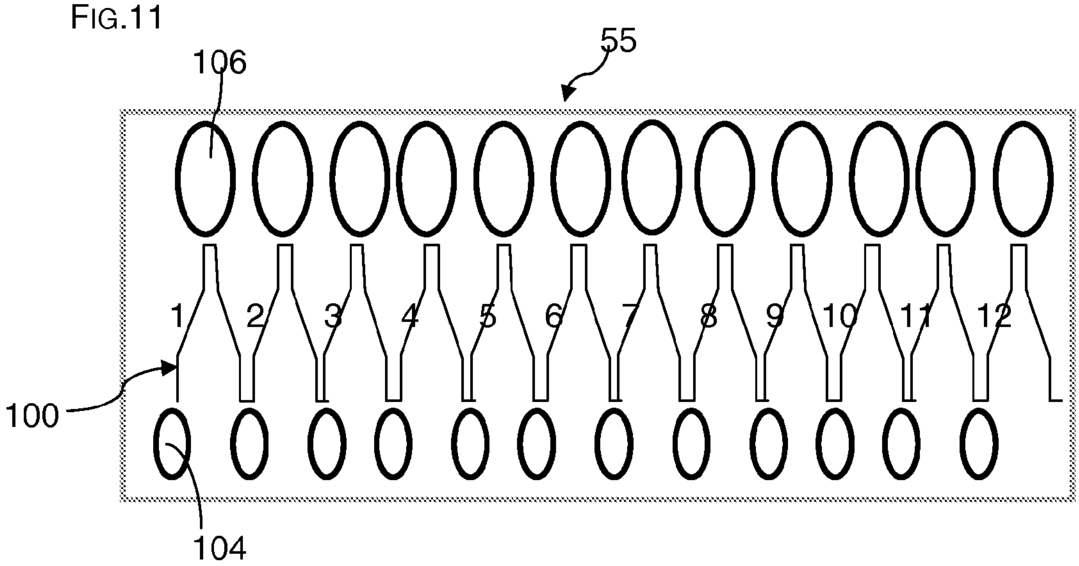
FIG. 11 shows a schematic view of the rectangular shaped multi-dosing detergent holder 55 comprising the guided means with linear track 100 comprising multiple doses of the first detergent composition 104 and the second detergent composition 106.
Figure 12:
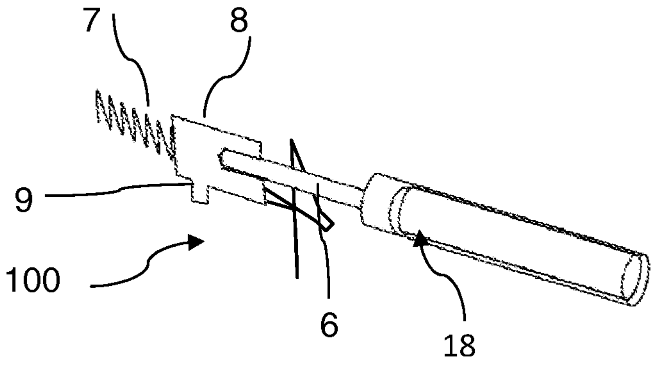
FIG. 12 shows a perspective detailed schematic view of the driving means 18 driving the following means 8 with follower pin 9 through the linear track 100 of FIG. 11.

As shown in FIG. 11 this linear zig-zag track 100 can be integrated into a rectangular shaped detergent holder 55 with a number of individual cavities containing the first 104 and second detergent doses 106. As described before each up and down path through the track 100 corresponds with a heating and cooling phase during the dishwashing operation. Two or more detergent doses can be delivered one after the other in the dishwashing machine at specific points in the wash. On FIG. 11 detergent doses for twelve different dishwashing operations are shown however it should be understood that this can easily be varied from 2 to 36 or more dishwashing operations, depending on the size of the detergent holder.

In a preferred embodiment of the invention this rectangular shaped detergent holder is a blister pack.

The automatic dishwashing detergent delivery system of the invention can have further features to indicate the number of doses used or still left to help the consumer decide when to refill the detergent holder. FIG. 7 shows a transparent window

108 on the housing 101 to display one number of a range, printed or marked in a circular pattern on the centre 109 of the detergent holder 102. When the detergent holder rotates, from one dishwashing operation to the next, the number changes behind the window 108. It should be noted that other characters, specific icons or colour coding can be used to communicate how many doses are left.

In more advanced executions of the invention sound or light signals can be generated by for instance storing energy in a coil-spring that slowly winds up with the rotational movement of the detergent holder and releases it energy via a mechanical switch when the detergent holder is almost empty.

Examples

A scenting composition is prepared as follows: 50 grams of Polybutene-1 grade DP8911M, supplied by LyondellBasell Industries are added to 50 grams of perfume, the resulting product is mixed at 85° C. for 4 h and then cooled down. 10 grams of this composition are placed in an auto-dosing device according the invention. The auto-dosing device has doses for 12 dishwashing operations. A pleasant smell can be noticed each time that the automatic dishwashing machine is open.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An automatic dishwashing product comprising a multi-dosing detergent delivery device for use in an automatic dishwashing machine, the multi-dosing detergent delivery device comprising a rotating actuating means and a returning means, the rotating actuating means comprising a driving means and a guided means; wherein the driving means comprises an axis around which a cover with the guided means can rotate inside of the cover; wherein the guided means comprises a circular zig-zag track having a warm harbor and a cold harbor, ramps, and slots; and wherein the driving means further comprises a cylinder filled with wax under a piston; wherein the returning means comprises two coil springs under the piston; and wherein the device further comprises a central cavity, wherein the central cavity comprises a scenting composition wherein the scenting composition comprises a perfume and a polyolefin.

2. The automatic dishwashing product according to claim 1 wherein the polyolefin has a crystallinity of about 5% to about 60%.

3. The automatic dishwashing product according to claim 1 wherein the scenting composition has a crystallinity of about 0.5% to about 60%.

4. The automatic dishwashing product according to claim 1 wherein the scenting composition has a melting point of above about 70° C.

5. The automatic dishwashing product according to claim 1 wherein the polyolefin is polybutene-1.

6. A method of scenting an automatic dishwashing machine during a dishwashing operation and between dishwashing operations, the method comprising the step of using the automatic dishwashing product according to claim 1 to continuously deliver a perfume.

* * * * *